United States Patent
Komara

[11] Patent Number: 5,970,406
[45] Date of Patent: Oct. 19, 1999

[54] TRANSLATOR FOR TIME DIVISION MULTIPLE ACCESS WIRELESS SYSTEM HAVING SELECTIVE DIVERSITY CIRCUITS

[75] Inventor: Michael Komara, Indialantic, Fla.

[73] Assignee: AirNet Communication Corp., Melbourne, Fla.

[21] Appl. No.: 08/774,568

[22] Filed: Dec. 31, 1996

[51] Int. Cl.[6] .............................. H04Q 7/20; H04Q 7/22
[52] U.S. Cl. ..................... 455/422; 455/424; 455/445; 370/442; 370/321
[58] Field of Search ........................... 455/422, 90, 405, 455/435, 418, 424, 445, 443, 444, 446, 447, 11.1, 12.1, 20, 22; 370/280, 337, 321, 347

[56] References Cited

U.S. PATENT DOCUMENTS

| | | |
|---|---|---|
| 3,035,169 | 5/1962 | Griffith . |
| 3,745,462 | 7/1973 | Trimble . |
| 3,781,684 | 12/1973 | Inslerman . |
| 3,922,674 | 11/1975 | Gingras et al. . |
| 4,028,501 | 6/1977 | Rittenhouse . |
| 4,384,358 | 5/1983 | Shiki et al. . |
| 4,797,947 | 1/1989 | Labedz . |
| 5,046,124 | 9/1991 | Wu et al. . |
| 5,109,390 | 4/1992 | Gilhousen et al. . |
| 5,233,626 | 8/1993 | Ames . |
| 5,506,867 | 4/1996 | Kotzin et al. . |
| 5,513,176 | 4/1996 | Dean et al. . |
| 5,613,197 | 3/1997 | Copeland et al. . |
| 5,661,724 | 8/1997 | Chennakeshu et al. . |
| 5,710,762 | 1/1998 | Petranovich . |
| 5,734,979 | 3/1998 | Lu et al. . |

*Primary Examiner*—William Cumming
*Assistant Examiner*—Linwood C. Scott
*Attorney, Agent, or Firm*—Farkas & Manelli, PLLC; Russell O. Paige

[57] ABSTRACT

In this approach to implementing a wireless communication system, in band translator components are located in the center of remote cells which would normally contain a base transceiver system (BTS). Selective diversity processing is implemented in the translators by providing for at least two spatially separated receive antennas and two receive path circuits in the up link direction. A diversity circuit is time synchronized to the downlink signal to provide for proper detection and selection of the appropriate signal to be forwarded to a centralized BTS. As a result, a separate diversity path need not be maintained for the remainder of each backhaul link, and radio frequency components such as a second upconverter, synthesizer and power amplifier associated with the range extender can be eliminated.

12 Claims, 3 Drawing Sheets

TRANSLATOR FOR TIME DIVISION MULTIPLE ACCESS WIRELESS SYSTEM HAVING SELECTIVE DIVERSITY CIRCUITS

FIELD OF THE INVENTION

This invention relates generally to wireless communication systems and in particular to diversity processing in an in-band translator that is deployed in peripheral cells to extend the range of a Base Transceiver System.

BACKGROUND OF THE INVENTION

The need for wireless communication services, such as Cellular Mobile Telephone (CMT), Personal Communication Services (PCS) and the like, typically requires the operators of such systems to serve an ever increasing number of users. As a result, certain types of multichannel broadband Base Transceiver Systems (BTSs) have been developed which are intended to service a relatively large number of active mobile stations in each cell. Such broadband BTS equipment can service, for example, ninety-six simultaneously active mobile stations, at a cost of less than $2000 to $4000 per channel.

While this equipment is cost effective to deploy when a relatively large number of active mobile stations is expected in each cell, it is not particularly cost effective in most other situations. For example, during an initial system build out phase, a service provider does not actually need to use large numbers of radio channels. As a result, the investment in broadband multichannel radio equipment may not be justified until such time as the number of subscribers increases to a point where the channels are busy most of the time.

There are certain techniques for expanding the service area of a cell site. For example, the HPT Cell Site Expander product manufactured by 3dbm Inc., of Camarillo, Calif., consists of a base station translator which samples downlink signal traffic and translates it to a selected offset frequency. The offset carrier is transmitted to an expansion cell site via directional antennas. At the expansion cell site, the carrier is translated back to the original cellular channel and transmitted throughout the expansion cell site coverage area such as via an omni-directional antenna. In the uplink direction, a cellular signal received by the expansion cell site from a mobile unit is translated and then transmitted back to the base station translator, which in turn translates the signal back to its original carrier frequency.

However, there are still other complex engineering considerations to maximize cell site efficiency. In particular, the system operator must also split up the allocated frequency channels among the cells, so that units operating in adjacent cells do not interfere with one another. In such a scenario, only a fixed number of transmit and receive operating frequencies are thus made available to service the mobile units in each cell. Movement of a mobile unit across a cell boundary must therefore be detected, so that the mobile can be reassigned a new pair of frequencies on which to operate in the new cell. This process, known as hand-off, must occur quickly, so that no interruption of a call in progress can be perceived. Unfortunately, at certain cell densities, the time to process a hand-off may become a significant factor in the ability of such systems to consistently provide reliable telecommunication service.

There are at least two factors which determine the speed at which a hand-off must occur, including (1) the rate at which the mobile unit passes through the cells, and (2) the extent to which non-uniformities in the radiated electromagnetic field in the cell affect the ability to accurately detect the signal from the mobile unit. Both of these factors depend upon the time required to accurately determine the relative location of the mobile unit. With respect to the speed of movement through the cells, in certain proposed PCS systems, the cells may be as small as five hundred (500) feet in radius. Thus, a mobile unit traveling only a few feet may require the handing off of the unit from one base station to a second and perhaps to even a third base station.

With respect to the second factor, because electromagnetic fields are usually non-uniform, a measurement of signal strength is typically made a number of times and then averaged. The time required to perform this measurement becomes longer as the susceptibility of the electromagnetic field to fading effects increases, such as may occur in an urban environment.

Diversity combining techniques can be used to compensate for such fading by generating a number of signal transmission paths, or diversity branches, each of which carry the same information signal, but which have uncorrelated multipath fadings. The diversity branches then are combined in some way to resolve the actually transmitted signal. It would be desirable to reduce the complexity of the operations required in detecting the position of a mobile unit, by taking advantage of diversity combining techniques in as efficient a manner as possible, with a minimum number of base station antennas and associated receiver processing and control equipment.

This can, however, be especially difficult in the case where the base station makes use of a wideband receiver which provides signals from many different remote units at the same time, because the multipath fadings must be compensated for each radio channel.

Furthermore, while a remote translator may be used to extend the radius of a cell, known designs do not suggest how to implement diversity selection among signals received from multiple mobile stations located in multiple expansion cells simultaneously. This is especially the case in a Time Division Multiple Access (TDMA) system, where the receive signals must be properly timed.

DESCRIPTION OF THE INVENTION

Objects of the Invention

It is an object of this invention to provide for diversity combining in a remote translator deployed in an expansion cell site.

Another object is to provide selective diversity processing on the time slot by time slot basis in such a translator for Time Division Multiple Access protocol signaling.

Yet another object of this invention is to extend the available range in a cellular communication system beyond that which is normally available with Time Division Multiple Access (TDMA) air interfaces.

Summary of the Invention

Briefly, the invention is used in a wireless communication system in which the cells are grouped into clusters. A host cell location is identified within each cluster and a multichannel Base Transceiver System (BTS) is located at or near the host cell site.

Rather than deploy a complete suite of base station equipment at each remaining cell in the cluster, translating radio transceivers are located in the remote expansion cells. These translators operate in-band, that is, within the frequencies assigned to the service provider.

The translators operate in both an uplink and downlink direction. In the uplink direction, signals transmitted by a mobile station located in a remote cell are received at the in-band translator, translated to a different carrier frequency, and then transmitted to the host BTS. Likewise, in the downlink direction, signals transmitted by the host BTS are first received by the in-band translator, translated to a different carrier frequency, and then transmitted to the mobile stations.

In accordance with the invention, selective diversity processing is implemented in the uplink receive portion of the translator by providing for at least two spatially separated antennas, at least two separate receive path circuits and a diversity selection circuit.

Diversity selection is made in a system adapted for use with Time Division Multiple Access (TDMA) protocol signaling systems on a time slot by time slot basis. Such diversity selection is possible through the use of a synchronization timing circuit that provides for time slot recovery in the downlink direction. The resulting time synchronization signal then is applied to the uplink portion in which the diversity processing is performed.

As a result, it is therefore possible to deploy translators in remote expansion cell sites so that multichannel base transceiver system equipment can be efficiently used, while at the same time taking advantage of selective diversity processing, just as would be available if a fully functional base transceiver system had been deployed at each expansion site. Such a translator may operate even with TDMA protocols, by detecting time synchronization signals in a downlink portion and applying them to diversity reception circuits in an uplink portion.

BRIEF DESCRIPTION OF THE DRAWINGS

For a more complete understanding of the invention and its novel advantages and features, reference should be made to the accompanying drawings in which.

DETAILED DESCRIPTION OF A PREFERRED EMBODIMENT

Figure 1:
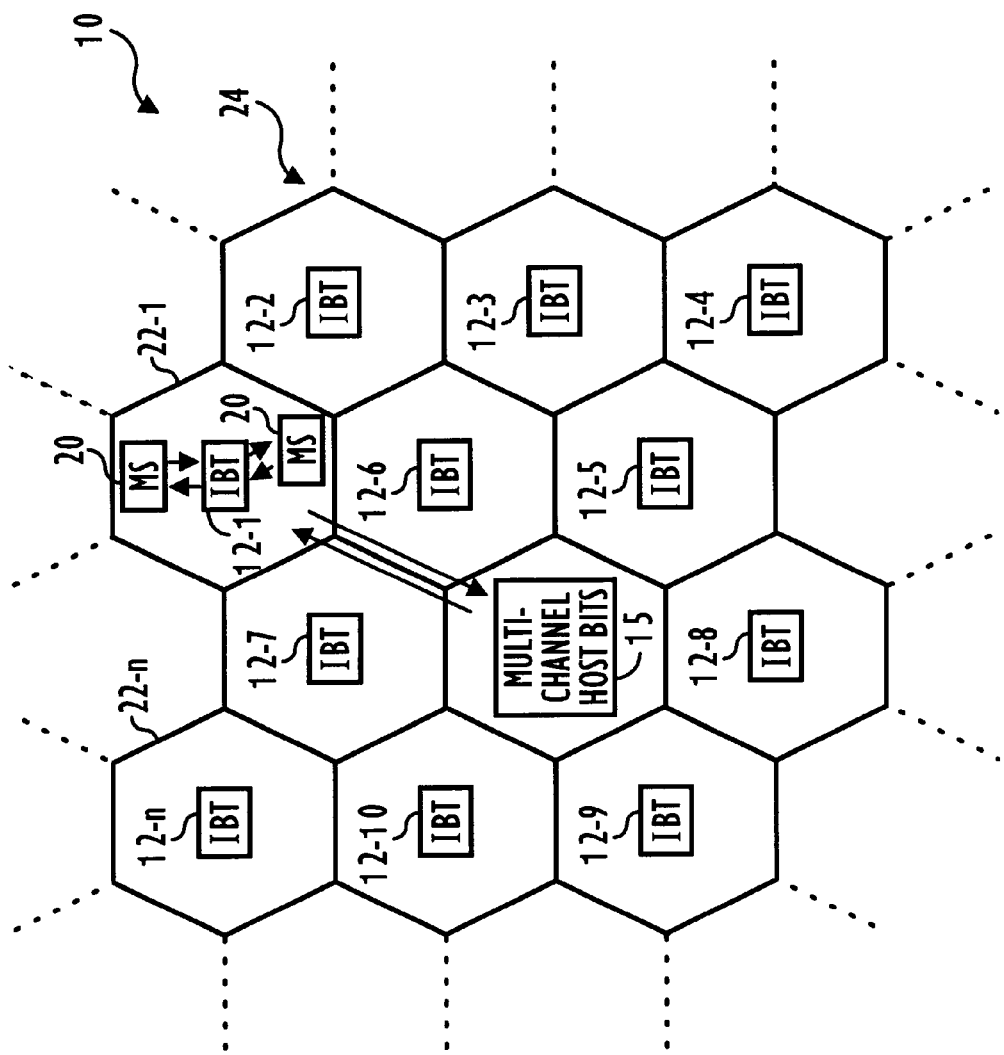
FIG. 1 is a view of a cell site cluster showing how a host Base Transceiver System (BTS), in-band translators, and mobile stations are deployed according to the invention.

FIG. 1 illustrates a wireless communication system 10 such as a cellular mobile telephone, Personal Communication System (PCS), or similar system in which a translator base station deployed in a remote cell uses a timing adjustment scheme according to the invention to enable proper selective diversity reception of signals received from mobile stations.

The system 10 provides voice and or data communication between mobile stations 20 and a Public Switched Telephone Network (PSTN) via radio signals. In the particular embodiment of the invention being described, the radio signaling protocol, or "air interface," uses a digital modulation such as a Time Division Multiple Access (TDMA) technique. For example, the system 10 may use the PCS-1900 standard promulgated by the Telecommunications Industry Association (TIA) in the United States [which is identical in relevant aspects to the Global System for Mobile Communication (GSM) standard promulgated in Europe and elsewhere by the European Telecommunication Standards Institute (ETSI)].

The translator base stations 12-1, 12-2, ... , 12-n (also referred to herein as the "in-band translators") are each located in what is approximately the center of a cell site 22 among a group or cluster 24 of cells. The in-band translators 12 receive radio signals from the mobile stations 20 located in their respective cells 22 and forward these signals to an associated multichannel host Base Transceiver System (BTS) 15. Likewise, radio signals originating at the host BTS 15 are forwarded by the translators 12 to the mobile stations 20. As a result, the signals associated with all of the mobile stations 20 located within the cluster 24 of cells 22-1, ... , 22-n are thereby processed at the host BTS 15.

The in-band translators 12 are "base stations" in the sense that they are each associated with a particular cell 22 and in that they each receive and transmit multiple signals from and to the mobile stations 20. However, the in-band translators 12 do not perform complete radio frequency (RF) demodulation and modulation functions as does a conventional base station. Rather, they perform a partial intermediate frequency (IF) demodulation and then a frequency-translation on signals received from the mobile stations 20. They then direct such signals on a different frequency to the host BTS 15. The in-band translators 12 also perform the inverse function, to frequency translate signals received from the host BTS 15-1 and then direct them to the mobile stations 20. The specific manner of translation will be discussed below in connection with FIG. 3.

Figure 2:
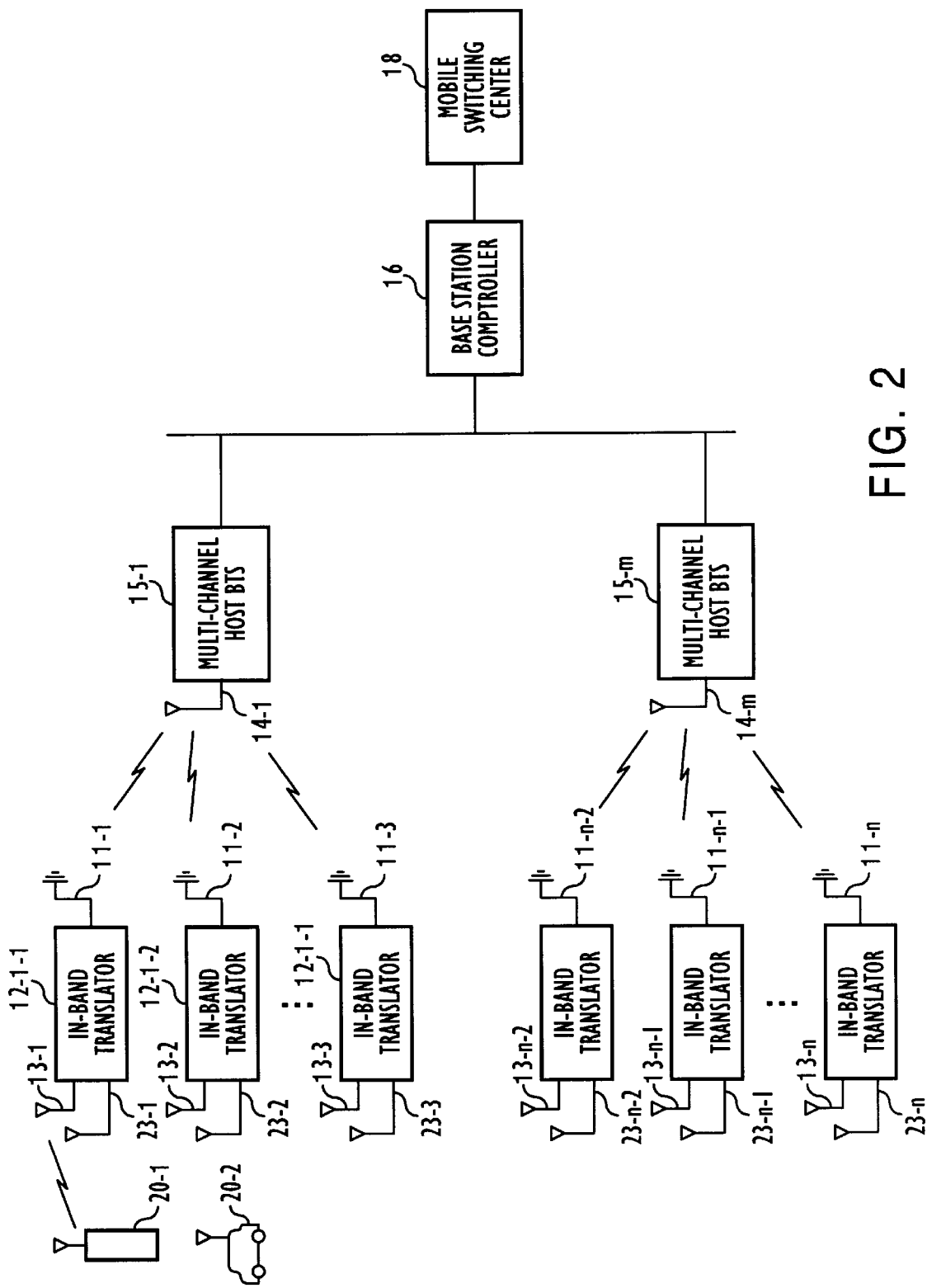
FIG. 2 is a block diagram of the components of the system.

Turning attention to FIG. 2, the system 10 more particularly includes translator directional antennas 11-1, ... , 11-n-2, 11-n-1, 11-n (collectively, the direction antennas 11), in-band translator base stations (range extenders) 12-1-1, ... , 12-n-1, ... , 12-n-12, a first set of translator omni-directional antennas 13-1, ... , 13-n, a second set of translator omni-directional antennas 23-1, ... , 23-n, host base station antennas 14-1, ... , 14-m, multichannel host Base Transceiver Systems (BTSs) 15-1, ... 15-m, one or more base station controllers 16, a mobile switching center 18, and mobile stations 20-1, 20-2.

The host BTSs 15-1, ... , 15-n are responsible for demodulating radio signals as well as for connecting such signals to the Public Switched Telephone Network (PSTN) through the mobile switching center 18. The host BTSs 15-1, ... , 15-n also modulate signals received from the PSTN through the mobile switching center 18 to format them for transmission over the air through the in-band translators 12. A particular host BTS 15-1 serves the multiple in-band translators 12-1-1, 12-1-2, ... , 12-1-n associated with a given cluster 24 of cells 22.

The Base Station Controller (BSC) 16, of which there may be more than one, has a number of functions. The primary function is to manage the logical connections made between mobile stations 20 and the PSTN. In order to do so, the Base Station Controller 16 assigns transmit and receive radio carrier frequencies to each individual mobile station 20, in-band translator 12, and host BTS 15. Typically, there may be five to twenty BTSs 15-1, ... , 15-n serviced by a single Base Station Controller 16.

An exemplary multichannel host Base Transceiver System (BTS) 15 uses broadband radio transceiver equipment to provide access to a number of contiguous receive and transmit channels simultaneously. The host BTS 15 is broadband in the sense that it covers a substantial portion of the radio frequency bandwidth available to the service provider operating the system 10. For example, the host BTS 15 may operate over a 5 megahertz (MHz) bandwidth in the 1900–2000 MHz range which contains as many as 25 radio carrier signals, each having an approximately 200 kilohertz (kHz) bandwidth. Each such carrier signal may typically contain up to eight (8) PCS-1900 channel signals.

A co-pending United States patent application entitled "Transceiver Apparatus Employing Wideband FFT Channelizer with Output Sample Timing Adjustment and Inverse FFT Combiner for a Multichannel Communication Network" filed Apr. 8, 1994 and which is assigned to AirNet Communications Corporation, the assignee of this application, describes the details of several embodiments of the multichannel host BTS 15.

Figure 3:
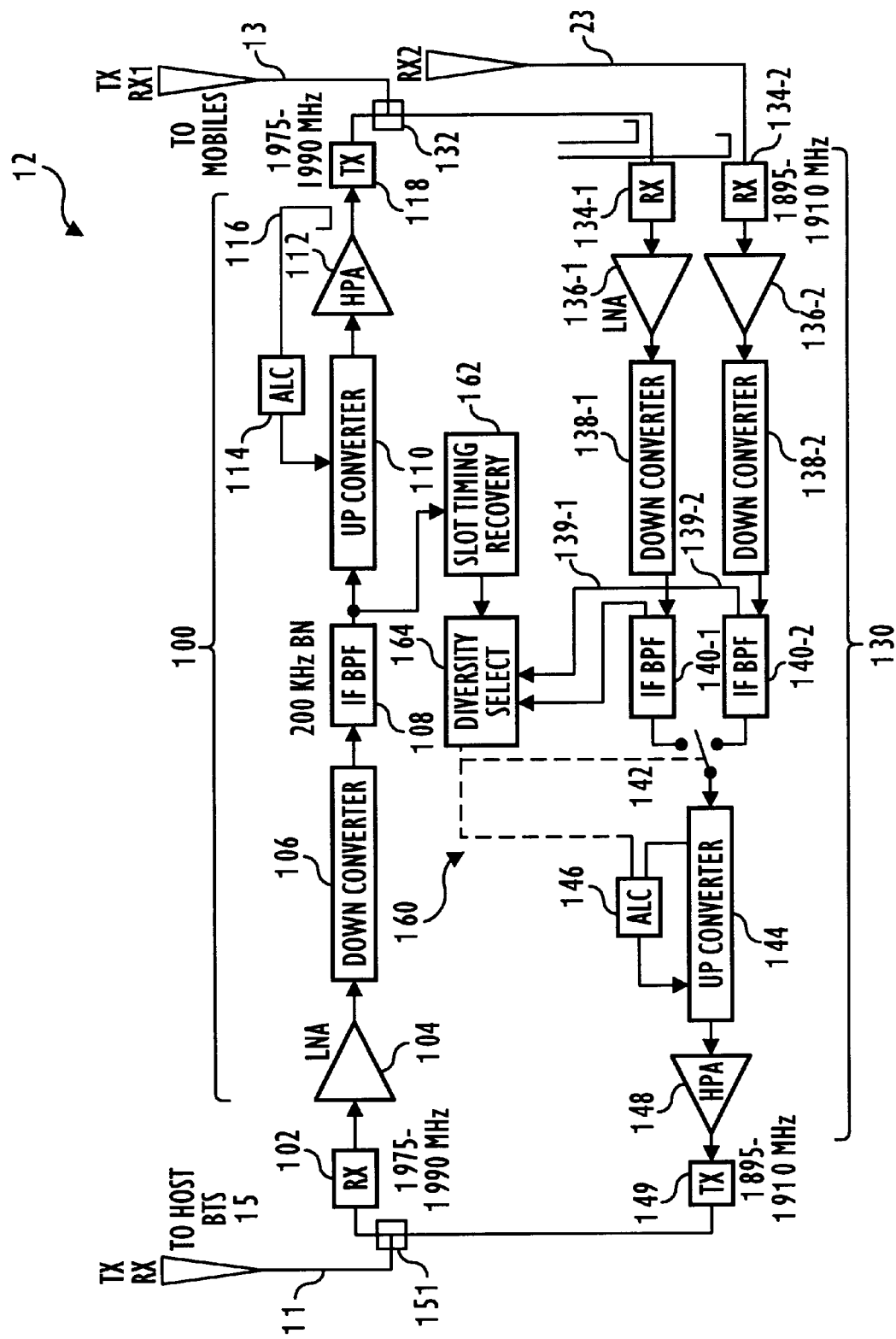
FIG. 3 is a block diagram of the in-band translator (or range extender) showing a diversity processing circuit.

FIG. 3 is a block diagram of one of the in-band translators 12 according to the invention. The in-band translators contain diversity processing equipment which allows the system 10 to provide the advantages of diversity reception on a time slot by time slot basis. This allows the system 10 to exhibit handover performance characteristics which are similar to a system in which a conventional Base Transceiver System (BTS) is deployed in each cell 22.

More particularly, an in-band translator 12 includes the direction antenna 11, the first omni-directional antenna 13, the second directional antenna 23, a backhaul to ground frequency translator 100, a ground to backhaul frequency translator 130, and a diversity control circuit 160.

The backhaul to ground frequency translator 100 includes a receiver 102, a low noise amplifier 104, a down converter 106, an intermediate frequency (IF) band pass filter 108, an upconverter 110, a high power amplifier 112, an automatic level control circuit 114, a directional coupler 116, and a transmitter 118.

The backhaul to ground translator 100 receives signals from the omni-directional antenna originating at the host BTS 15. The backhaul to ground translator 100 shifts the carrier frequency of such signals to a different frequency which is within the band width of the frequencies allocated to the operator of the system 10. In a PCS 1900 system, for example, signals may be received from the host BTS in a range of say 1975–1990 MegaHertz (MHz). As previously described, each such signal has a 200 kilohertz (kHz) bandwidth. The signal then is frequency translated to a different carrier frequency in the 1975–1990 megahertz band width. The signal then is sent out through a duplexer 132 to one of the first omni-directional antenna 13.

The intermediate frequency (IF) in use may, for example, be in the range of 250 MegaHertz. The receiver 102, LNA 104, down converter 106, IF band pass filter 108, upconverter 110, HPA 112 and automatic level control circuit 114 operate as in a conventional radio receiver to select the desired 200 kilohertz bandwidth signal. At the output of the IF band pass filter 108, the signal then is processed by the upconverter 110 to shift carrier frequency to the desired output radio frequency. The HPA 112 imparts the desired power level to the signal to complete a connection to the mobile units located in the cell being served by the translator 12.

The signals received from the host BTS 15 at the directional antenna 11 are referred to herein as the backhaul signals, since they carry signals from the host BTS 15 to the translator 12. The signals received on the omni-directional antennas 13 and 23 from the mobile units 20 are referred to as the ground signals, since they carry signals from the translator 12 down to the mobile units located on the "ground".

The particular advantages of the invention are provided in the ground to backhaul frequency translator 130 and diversity processing circuit 160. In particular, the ground to backhaul frequency translator 130 provides for diversity reception in the uplink direction by supporting at least two complete receive paths.

The first receive path consists of the first omni-directional antenna 13, a duplexer 132, a first receiver 134-1, a first low noise amplifier 136-1, a first down converter 138, and a first IF band pass filter 140-1. The second receive path is provided by the second omni-directional antenna 23, the second receiver 134-2, a second low noise amplifier 136-2, a second downconverter 138-2, and a second IF band pass filter 140-2. The first and second receive paths thus operate independently of one another.

The radio carrier frequency signals received on the respective omni-directional antenna 13 or 23 are first passed to the respective one of the receive filters 134-1 or 134-2. The receive filters 134 accept signals in the radio frequency band allocated to the operator of the system 10. In the case of a PCS 1900 system, for example, signals may be received in a range of 1895–1910 MHz. The output of the respective filters 134-1 and 134-2 are passed to the respective one of the low noise amplifiers 136-1 or 136-2 and from there to the respective one of the downconverters 138-1 or 138-2 and one of the intermediate frequency band pass filters 140-1 of 140-2. The downconverter 138 and IF band pass filter 140 may operate at a convenient intermediate frequency such as in a range of 250 MHz.

The switch 142, upconverter 144, automatic level control 146, high power amplifier 148 and transmit filter 149 comprise the remainder of the ground to backhaul frequency translator 130. The output of the switch 142 is coupled to the upconverter 144 which translates the selected intermediate frequency signal to the desired output radio carrier frequency. The output radio carrier frequency is in the same range as the input on the ground side of the unit but at a particularly different radio carrier, such as from 1875–1910 MHz. The output of the power amplifier is passed to the transmit filter 149 and from there to the directional antenna 11. It may or may not be necessary to use a duplexer 151 to enable the coupling of the transmit and receive signals on the backhaul side of the translator 12.

The use of a pair of spatially diverse antennas 13 and 23 for the uplink path provides for diversity gain to mitigate deep fading characteristics. This is because fades occur at different times for the spatially separated antennas 13 and 23 which are spaced apart by approximately eight wavelengths or more.

Rather than return both spatially diverse uplink receive signals to the host BTS 15 over separate in-band backhaul frequencies, the present invention utilizes the switch 142 and diverse selection circuit 160 to select one of the receive paths to be coupled to the upconverter 144. This provides an advantage in which the host BTS 15 need only monitor a single frequency and need not perform diversity processing for each channel. It also provides an advantage in that a second upconverter high power amplifier and transmit filter components are not needed to provide for a second uplink radio channel.

The diversity processing circuit 160 operates to select one of the receive paths to be coupled to the upconverter 144. In particular, the slot timing recovery circuit 162 accepts as an input the output of the IF band pass filter 108 in the downlink chain 100. The slot timing recovery circuit 162 is necessary in a system such as a PCS 1900 system in that the channel signals are Time Division Multiple Access (TDMA) type signals which have a digital time division multiplex modulation. The modulation is such that eight individual multiplexed baseband signals are modulated onto a single given radio carrier frequency signal. Each of the eight TDMA signals typically may originate from a different one of the mobile stations 20. In turn, each of the individual mobile stations 20 is typically located in a different portion of the cell 22. As such, a diversity decision must be made independently for each time slot because fading characteristics due to interference between direct and reflected signal paths depends upon the distance between each respective mobile station 20 and the in band translator 12.

The slot timing recovery circuit 162 operates by taking advantage of the fact that a PCS 1900 circuit signal may be digitally modulated such that the signal power ramps up over a leading rise time and ramps down over a trailing fall time in each time slot. The power ramping in each time slot burst can be detected by the slot timing recovery circuit using a digital signal recovery technique such as by using phase lock loop recovery techniques.

The timing signal output by the slot timing recovery circuit 162 then is used to trigger diversity selection. Particularly, once a slot timing signal is recovered, it is fed to a diversity selection circuit 164 which drives the control input of the switch 142.

A power level detector 139-1 and 139-2 associated with each of the receive paths each feed back a portion of the energy in a respective receive path to the diversity select circuit 164. The diversity selection circuit 164 connects the receive path having the greater magnitude at a particular instant in time to its output. This occurs in synchronization with the timing signal output by the slot timing recovery circuit 162 so that the diversity select circuit 164 operates to select the path having the greater magnitude during each time slot. This logical determination then is used to control the position of the switch 142.

An automatic level control circuit 146 may also be under the control of the diversity select circuit 164 and includes sample and hold circuits to maintain the appropriate level as each reception path is selected.

By providing for time slot recovery from the downlink signal path, diversity reception functionality may be provided on the uplink signal path within the translator 12. This provides for a system 10 in which the advantages of diversity processing are retained while at the same time taking advantage of the distributed channel management functionality provided by the translator 12 and multichannel host BTS 15.

What is claimed is:

1. A wireless communication system comprising a plurality of cells, the plurality of cells being located substantially adjacent one another, and the cellular communication system operating over a specified frequency range; the wireless communication system operating over a specified frequency range and making use of a frequency allocation plan that arranges the plurality of cells into clusters, each of said clusters of cells further comprising a centrally located home base station cell and at least one translator cell, the system comprising:

a plurality of mobile stations located in a service area covered by said clusters of cells, each mobile station transmitting and receiving a radio signal; and home base station means located in said home base station cell, said home base station means including a broadband Base Transceiver System, BTS, for receiving and transmitting multiple radio signals on multiple respective carrier frequencies, including means for demodulating said received radio signals and for coupling demodulated signals to a switching means, and means for modulating signals received from the switching means and coupling them for radio transmission on the multiple carrier frequencies;

a plurality of in band translator means, at least one of said plurality of in band translator means located in each one of the translator cells in the cluster, each in band translator means for communicating with said plurality of mobile stations and said home base station means, each in band translator means including an uplink portion comprising:

first intermediate frequency, IF, receiving means for receiving a first ground signal from one of said plurality of mobile stations, and downconverting a carrier frequency of the first ground signal to a selected intermediate frequency to produce a first IF signal;

second intermediate frequency, IF, receiving means for receiving a second ground signal from the one of said plurality of mobile stations and downconverting a carrier frequency of the second ground signal to the selected intermediate frequency to produce a second IF signal;

selective diversity processing means, connected to receive the first and second IF signals, and for selecting one of the first and second IF as a selected signal; and upconversion means, connected to receive the selected signal, and for upconverting a carrier frequency of the selected signal to a radio frequency, to produce a backhaul signal.

2. A system as in claim 1 wherein each in band translator additionally comprises first and second spatially diverse antennas for providing the first and second ground signals.

3. A system as in claim 1 wherein each in band translator means additionally includes a downlink portion comprising:

third intermediate frequency, IF, receiving means for receiving a second backhaul signal from the home base station means and downconverting a carrier frequency of the second backhaul signal to a second selected intermediate frequency to produce a third IF signal;

second upconversion means, connected to receive the third IF signal, and for upconverting a carrier frequency of the third IF signal to a radio frequency, to produce a third ground signal.

4. A system as in claim 3 wherein Time Division Multiple Access, TDMA, signaling is used for the ground and backhaul signals, and each in band translator additionally comprises:

slot timing synchronization means connected to receive the third intermediate frequency signal and for operating on the third intermediate frequency signal produced by the downlink portion to recover a time slot reference signal, and wherein said selective diversity processing means selects the selected signal in synchronization with the time slot reference signal.

5. A system in claim 4 wherein each in band translator additonally comprises:

automatic level control means, connected to the upconversion means and connected to receive the time slot reference signal, for controlling an output level in the backhaul signal in synchronization with the time slot reference signal.

6. A system as in claim 1 wherein said plurality of mobile stations comprises at least a first one of said plurality of mobile stations located in a first one of said plurality of cells, and a second one of said plurality of mobile stations located in a second of said plurality of cells.

7. A system as in claim 6 wherein said in band translator means simultaneously receives a first ground signal and a second ground signal from both said first one of said plurality of mobile stations and said second one of said plurality of mobile stations.

8. A system as in claim 7 wherein each in band translator means additionally includes a downlink portion comprising:
   third intermediate frequency, IF, receiving means for receiving a second backhaul signal from the home base station means and downconverting a carrier frequency of the second backhaul signal to a second selected intermediate frequency to produce a third IF signal;
   second upconversion means, connected to receive the third IF signal, and for upconverting a carrier frequency of the third IF signal to a radio frequency, to produce a third ground signal.

9. A system as in claim 3 wherein said in band translator means simultaneously receives
   said first ground signal and said second ground signal from both said first one of said plurality of mobile stations and said second one of said plurality of mobile stations, and
   said second backhaul signal from said home base station means.

10. A system as in claim 8 wherein said in band translator means simultaneously receives
    said first ground signal and said second ground signal from both said first one of said plurality of mobile stations and said second one of said plurality of mobile stations, and
    said second backhaul signal from said home base station means.

11. A system as in claim 8 wherein Time Division Multiple Access, TDMA, signaling is used for the ground and backhaul signals, and each in band translator additionally comprises:
    slot timing synchronization means connected to receive the third intermediate frequency signal and for operating on the third intermediate frequency signal produced by the downlink portion to recover a time slot reference signal, and
    wherein said selective diversity processing means selected the selected signal in synchronization with the time slot reference signal.

12. A system as in claim 11 wherein each in band translator additionally comprises:
    automatic level control means, connected to the upconversion means and connected to receive the time slot reference signal, for controlling an output level in the backhaul signal in synchronization with the time slot reference signal.

* * * * *